A. GREENMAN.
Device for Trapping the Apple-Worm.
No. 203,336. Patented May 7, 1878.
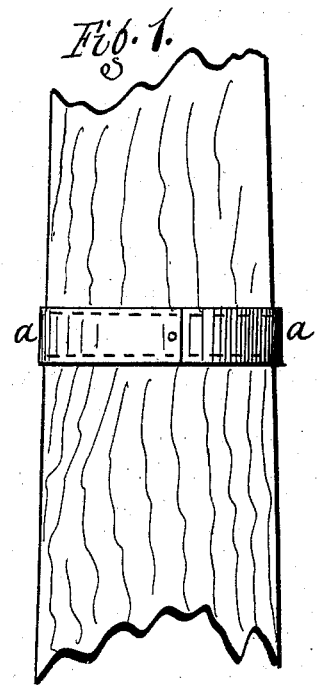
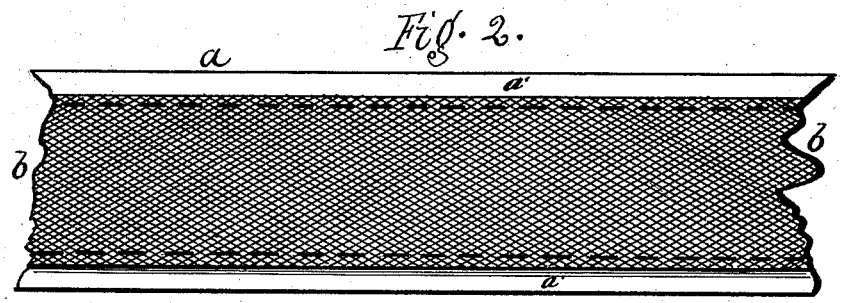
Attest.
Edwin Scott
R. E. White
Inventor.
Arthur Greenman,
per R. L. Osgood,
Atty.

UNITED STATES PATENT OFFICE.

ARTHUR GREENMAN, OF LOCKPORT, NEW YORK.

IMPROVEMENT IN DEVICES FOR TRAPPING THE APPLE-WORM.

Specification forming part of Letters Patent No. 203,336, dated May 7, 1878; application filed January 19, 1878.

*To all whom it may concern:*

Be it known that I, ARTHUR GREENMAN, of the city of Lockport, in the county of Niagara and State of New York, have invented a certain new and useful Improvement in Devices for Trapping the Apple-Worm; and I do hereby declare that the following is a full, clear, and exact description of the same, reference being had to the accompanying drawings, in which—

Figure 1 is an elevation of the trunk of an apple-tree, showing my improvement applied thereto. Fig. 2 is an interior face view of the trap. Fig. 3 is a cross-section of the same.

The object of my invention is to provide means for entrapping the apple-worm or coddling-moth, and thereby preventing its ravages upon the apples. These moths appear in great numbers in early June, and lay their eggs in the eye or blossom end of the young fruit. In a short time the eggs hatch and the grub burrows its way to the core. The fruit falls to the ground, the grub escapes and crawls into the crevices of the bark, and remains till the succeeding spring, when the young moth again emerges from it.

My object is to provide a trap in which the grubs will burrow or form their cocoons, and from which they can be readily removed; and the device consists of a strap of pasteboard, metal, or other suitable material, which encircles the tree, said strap having an interior lining of cotton flannel or other equivalent fibrous material, as hereinafter described.

*a* represents the strip which encircles the trunk of the tree. It is preferably made of pasteboard, as the cheapest material, but may be of tin, sheet-iron, or other suitable substance. It is usually of two or three inches in width, and of a length to reach around the tree, being secured thereto by a tack or nail, or other suitable means, at the end.

The lower edge *a'* of the outer band stands out from the tree, and thus a passage is formed, which guides the grub directly to the flannel, and prevents it from crawling over the outside of the band.

The long soft nap of the flannel is well adapted to the formation of a cocoon, and the grub, immediately on reaching it, takes advantage of this quality and envelops himself therein.

To the inner face of this strap is sewed or otherwise attached a strip, *b*, of cotton flannel, having a nap, the width of which is somewhat less than the outer strap, so as to leave a space, *a'*, under the lower edge of the outer strap for the grub to crawl up into. When the worm crawls into this space its passage is arrested by the close fitting of the cotton to the trunk of the tree, and, finding a congenial resting-place, it forms its cocoon in the cotton, and remains there, instead of depositing itself under the bark. In this condition it is readily removed by detaching the strap from the tree and removing the cotton from the strap.

I am aware that means have before been used for decoying the worm, which consists in laying a cloth in the crotch of the tree, or in tying a band of straw around the trunk; but as such devices cannot be made close-fitting they are not fully effective.

I am also aware that bands and various devices have been secured around trees to simply prevent ascent of insects.

A band of sheep-skin has also been placed around a tree; but the grub, being averse to oil, of which there is a great deal in wool, will not form cocoons therein, and the wool fibers are, besides, too stiff, and are so far apart on the skin as to permit the grub to pass between them.

In contradistinction to such devices, my invention consists of an exterior band or strap, having an interior lining of cotton having a nap, which is made close-fitting to the tree, which forms a soft bed for the worms to burrow in, and which, by being readily removable, obviates the discarding of the outer strap or band.

In applying the device, the outer rough bark of the tree should be rossed off, to present as smooth a surface as possible.

I do not claim, broadly, a band applied around the trunk of the tree; but

I claim—

1. The apple-worm trap consisting of a flexible outer band, *a*, of pasteboard, sheet metal, or similar material, and the inner band of cotton flannel, having its napped surface arranged to come in contact with the tree, substantially as and for the purpose set forth.

2. The combination, in an apple-worm trap, of the strap $b$, of cotton flannel, and the strap $a$, of pasteboard, sheet metal, or similar material, having projecting edges $a'$, substantially as and for the purpose set forth.

In witness whereof I have hereunto signed my name in the presence of two subscribing witnesses.

ARTHUR GREENMAN.

Witnesses:
R. F. OSGOOD,
JACOB SPAHN.